Figure 7:
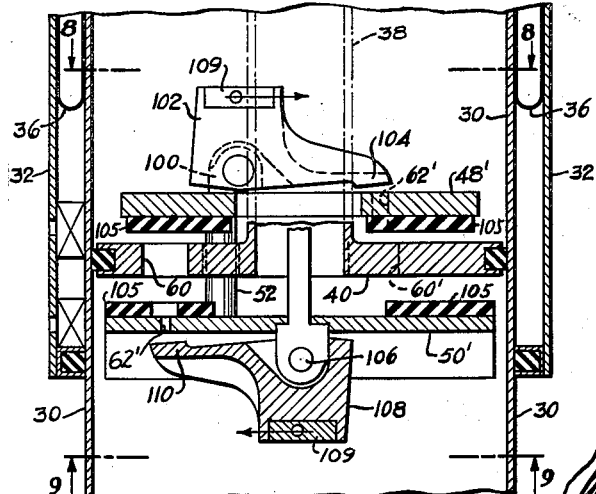

July 25, 1961  A. R. PARILLA  2,993,691
VEHICULAR FLUID SPRINGS
Filed Jan. 30, 1957  3 Sheets-Sheet 1
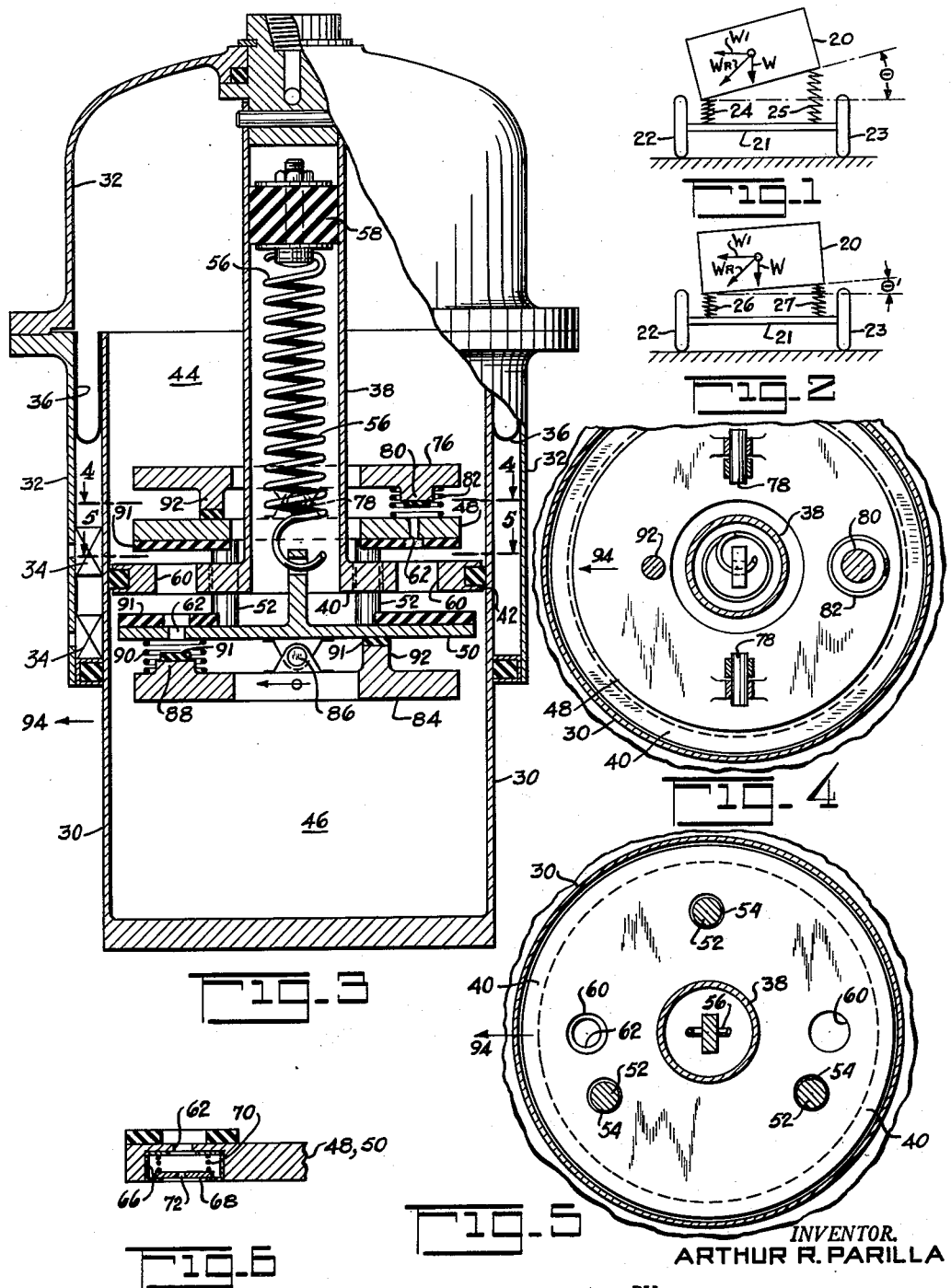
INVENTOR.
ARTHUR R. PARILLA
BY Godfrey B. Spear
ATTORNEY July 25, 1961 A. R. PARILLA 2,993,691
VEHICULAR FLUID SPRINGS
Filed Jan. 30, 1957 3 Sheets-Sheet 2

*INVENTOR.*
ARTHUR R. PARILLA
BY *Godfrey B. Speir*
ATTORNEY

July 25, 1961     A. R. PARILLA     2,993,691
VEHICULAR FLUID SPRINGS
Filed Jan. 30, 1957     3 Sheets-Sheet 3
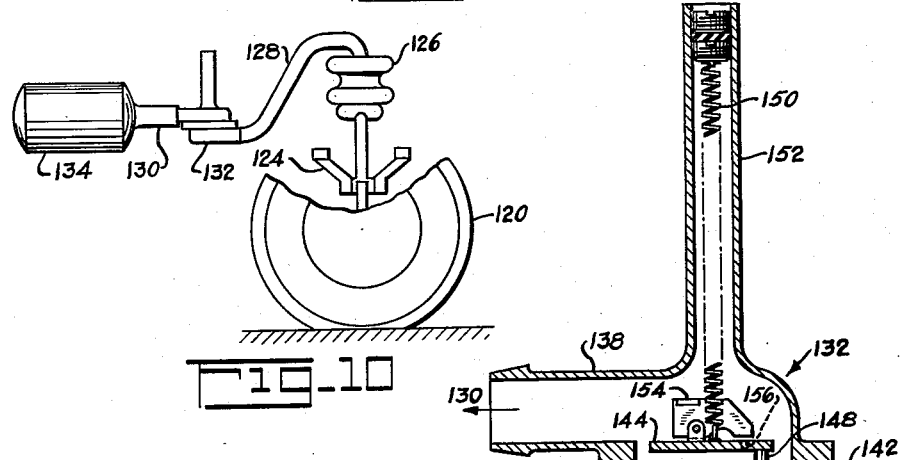
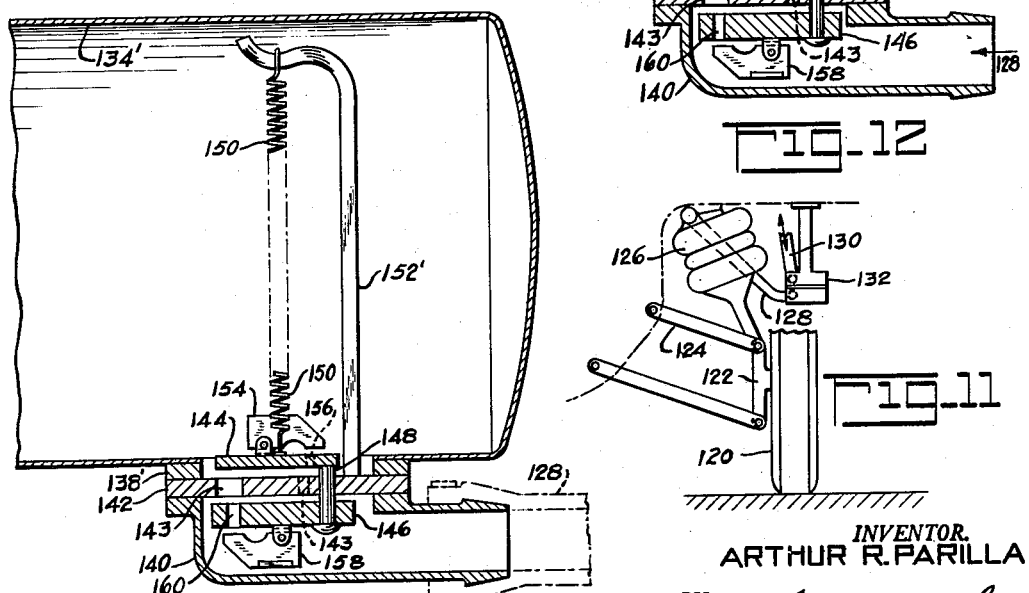
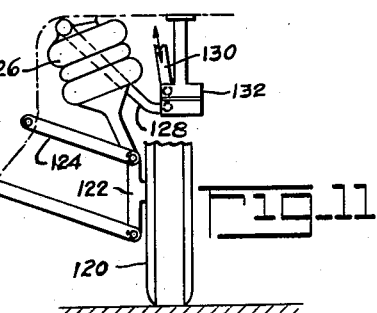
INVENTOR.
ARTHUR R. PARILLA
BY
ATTORNEY United States Patent Office 2,993,691
Patented July 25, 1961

2,993,691
VEHICULAR FLUID SPRINGS
Arthur R. Parilla, 34 Crestview Road,
Mountain Lakes, N.J.
Filed Jan. 30, 1957, Ser. No. 637,272
8 Claims. (Cl. 267—65)

This invention relates to automotive spring suspension systems, particularly to those employing fluid springs.

Objects of the invention are, to provide means in conjunction with fluid springs to suppress vehicle body sway by automatically adjusting the spring rates in response to pitching or rolling moments, to provide damping in fluid springs to suppress "bounce," whereby to secure improved riding quality, and to provide the necessary mechanisms for these purposes which can readily be incorporated in simple types of fluid springs with minimum complication and cost.

The improvements of the invention bear a relationship to dual-rate fluid springs of the sort shown in my Patent #2,275,462 or in analogous types of fluid springs. The description following, and the accompanying drawings, show several arrangements of fluid springs and of the invention as applied to them, to enable a clear understanding of the principles involved and preferred modes of application of the invention.

In general, a smooth and soft vehicle ride is secured by the use of low-rate or "soft" springs, whereby unsprung parts may move readily with respect to the sprung body. Little damping, in the form of shock absorbers, is needed to prevent bounce where wheel motion alone is involved. To secure an improved ride, the suspension system should be responsive to body motion, to damp the springs when body motion occurs to promptly resist such motion. That is, the system should discriminate between wheel motion and body motion, to adjust the system for optimum stability of the body, regardless of the cause of the disturbance. This discrimination applies to spring damping or shock absorption, which is necessary to minimize continuing undulation of the body. In the conventional systems in use today, neither the springs nor the dampers or shock absorbers are able to discriminate between wheel and body motion, nor is there any provision for modifying spring rates or damping, even if there were a discriminator of some sort. According to the present invention, selective critical damping is incorporated in a fluid spring, with means to apply the damping when body oscillations occur, and to hold it out of action when wheel oscillations occur.

In the present invention, each basic fluid spring also provides a low spring rate to provide a normally "soft" ride, and a high spring rate which is automatically brought into action in response to body movement caused by lateral forces. Such response results from transverse body movement such as rolling or pitching, which occur when a vehicle goes around a turn or pitches during rapid acceleration or deceleration. The vehicle's tendency to roll or pitch is accompanied by a dynamic center of gravity shift due to side forces. These sides forces are used to control the fluid springs individually, both as to spring rate and damping effect, during both spring compression and expansion. This results in superior ride control for the vehicle.

Some prior systems use "sway bars," but these provide stability at the expense of riding quality. Sway bars connect, say, the two rear wheels together by a floating spring. If both rear wheels bounce together the sway bar floats with both. In a turn, the net springing of the inside wheel is decreased in rate while that of the outside wheel is increased, thereby minimizing sway. If one rear wheel strikes a bump or depression, its motion stresses the sway bar, thus reacting in the other rear wheel spring and producing a tremor in the other side of the body as well as in the bump side. This undesirable reaction is eliminated in my invention, as each wheel spring acts and responds independently.

Figure 16:
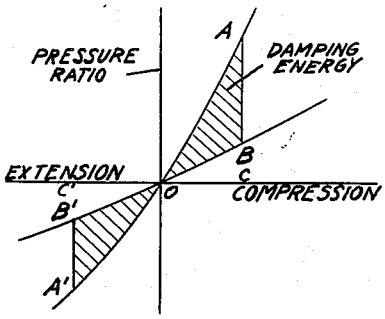
Figure 8:
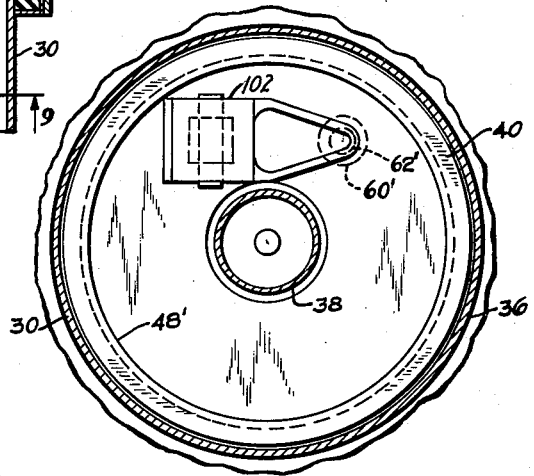
Figure 9:
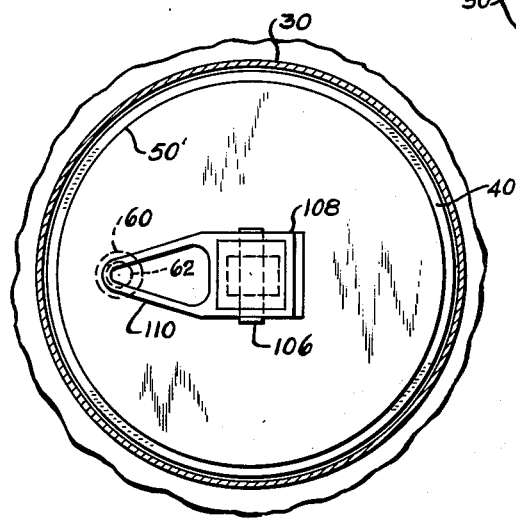
Figure 14:
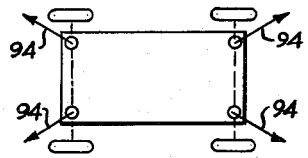

A fuller appreciation of the invention will be had from the following detailed description when read in connection with the drawings, wherein similar reference characters designate similar parts and wherein:

FIG. 1 is a diagram of a sprung vehicle in a turn not provided with sway compensation, FIG. 2 is a diagram of the same vehicle with sway compensation, FIG. 3 is a longitudinal section through a fluid spring according to one arrangement of the invention, FIG. 4 is a section on the line 4—4 of FIG. 3, FIG. 5 is a section on the line 5—5 of FIG. 3, FIG. 6 is a fragmentary section through a damping valve used as described in the arrangement of FIG. 3, FIG. 7 is a fragmentary longitudinal section through an alternative form of the invention, FIG. 8 is a section on the line 8—8 of FIG. 7, FIG. 9 is a section on the line 9—9 of FIG. 7, FIG. 10 is a schematic side elevation of the invention used with a bellows fluid spring system, FIG. 11 is a schematic end elevation of the invention of FIG. 10, FIG. 12 is an enlarged detailed view of the invention as applied in FIGS. 10 and 11, FIG. 13 is an alternative section of the invention used with and attached to a fluid accumulator, FIG. 14 is a diagram of fluid spring arrangement on a vehicle, FIG. 15 are curves comparing the action of a vehicle with conventional springing and with the spring system of the invention, and FIG. 16 includes curves showing the damping effect of elastic fluids as used in the invention.

Referring briefly to FIGS. 1 and 2, a vehicle body is shown at 20, supported on an axle 21, supported in turn on wheels 22 and 23. In FIG. 1, the connection from body 20 to axle 21 is through soft springs 24 and 25. When centrifugal force, or a lateral force, is exerted on the body at its center of gravity, as when rounding a curve, the horizontal force $W_1$, as well as the weight W, acts on the springs. The resultant $W_R$ of W and $W_1$ will act predominantly on the "outside" spring 24 to compress it and may allow the "inside" spring 25 to expand, thereby tilting the body through an angle, $\theta$. When springs 24 and 25 are soft to produce an easy ride, the outside spring such as 24 will deflect considerably while the inside spring 25 will expand, producing a large sway angle $\theta$.

In FIG. 2, springs 26 and 27 are stiffer, so that with the same forces acting and the same vehicle configuration, the sway angle $\theta$ is greatly reduced.

The desideratum is to retain the soft springs of FIG. 1 for straight travel, and automatically to convert to the stiff springs of FIG. 2 when turning the vehicle. This is accomplished by the invention. Additionally, the invention provides discriminated damping accordingly as the wheels are in vertical motion, requiring no damping except at high rates and magnitudes of oscillation, or the body is in vertical motion and requires damping to suppress body oscillation.

Now referring to FIGS. 3 to 6, I show a self-contained fluid spring, comprising a lower cylinder 30 slidable within an upper cylinder 32, the former being adapted for securement to the vehicle individual wheel axle, and the latter to the body. The two cylinders are relatively guided for vertical reciprocation by bushings 34, and are sealed against fluid leakage by a rolling fluid seal membrane 36. Centrally within the upper cylinder 32 and secured thereto is a tube 38 carrying a piston 40 which is slidably sealed at its rim as at 42 to the inner wall of the lower cylinder 30. The piston 40 divides the fluid spring into an upper chamber 44 and a lower chamber 46. A valve plate 48 lies above the piston 40, and another valve plate 50 lies below the piston. These are joined by struts 52 extending through holes 54 in piston 40, so that the plate 48 can move down against piston 40, or plate 50 can move up against piston 40, the plates moving in unison. The assembly 48, 50, 52 is suspended by a low-rate spring 56 running up into the tube 38, to which it is adjustably secured by an expandable packing 58.

Ports 60 are formed in the piston 40. When the assembly 48, 50, 52 is hanging free as shown, chambers 44 and 46 are in free communication through these ports. When cylinder 30 oscillates, cylinder 32 being steady, fluid under pressure in the combined volumes of chambers 44 and 46 provides a low-rate, relatively undamped, spring. When cylinder 32 oscillates due to body motion, the assembly 48, 50, 52, comprising an inertia mass, closes against the upper or lower sides of ports 60, separating the chambers 44 and 46 from each other except through damping port 62.

During wheel motion, with the ports 60 open, there is minimum damping of wheel action for normal frequencies and amplitudes of operation. However, should wheel oscillation become violent, as when the frequency of oscillation approaches the natural frequency of the system, the velocity of passage of fluid through the ports 60 becomes great and will inherently exert damping on the oscillations. This velocity effect is much more pronounced with gaseous fluids as used in these fluid springs, than with viscous liquids as in conventional shock absorbers. Port size may be designed to attain this effect, to allow virtually free fluid passage for normal transfer, and damped fluid passage for high velocity fluid transfer. When the wheel oscillations attain a character to produce body motion, closure of the ports 60 will create damping, particularly in connection with the damping orifices in plates 48 and 50 now to be described.

When body oscillations take place it is desirable to damp them by dissipating some of their energy. This is accomplished by damping orifices of comparatively small size, as at 62 in the plates 48 and 50, which bleed fluid relatively slowly from the high pressure to the low pressure chamber. Thus if ports 60 are closed by either plate 48 or 50 respectively by upward or downward body acceleration, the high fluid pressure respectively in chambers 44 or 46 is bled off into the lower pressure chamber through orifices 62, to provide inherent damping or shock absorption. Thus the shock absorption action of the fluid spring discriminates between wheel or body motion providing low damping, as well as low-rate spring action during wheel acceleration, and high damping as well as high-rate spring action during body acceleration.

Further discrimination may be had between up and down body acceleration by using a smaller orifice 62 in the upper plate 48 and a larger orifice 62 in the lower plate 50. This is because the rate of pressure change is less with spring extension, and also provides the usual provision of greater damping for rebound than for downward "jounce."

The discrimination of damping may be made more nearly critical by the use of inserts in orifices 62 as shown in FIG. 6, applied to either or both plates 48 or 50 or in the orifice 60 of piston 40. In FIG. 6, the plate is formed with a receptacle in which is pressed a cup 66, flanged at its lower end to confine a valve ring 68. The latter is spring pressed downwardly by a spring 70, and contains an orifice 72 which is smaller than the orifice 62. On sufficiently strong downward acceleration of the plate (and of the piston 40) the valve ring 68 is moved off its seat against the force of spring 70, making the orifice 62 effective for damping. If the downward acceleration is moderate, a high degree of damping is afforded by the orifice 72, as the valve ring 68 remains on its seat.

In order to illustrate the dissipation of energy for damping, the case of body motion is considered first with the aid of FIG. 16, which shows fluid pressure within the cylinder as a function of spring deflection for the theoretical case with no orifices in pilot masses, and free unrestricted flow through valve seat.

Curve B—B' represents the low spring rate curve, corresponding to wheel motion with body in normal position, (inertia valve open) thus providing uniform compression and expansion within the entire volume of the fluid spring, or the low spring rate.

Curve A—A' represents the high spring rate curve, when wheels are in normal position, and body motion occurs (inertia valve closed).

It may be seen that for wheel motion from O to C, the pressure rise for uniform compression is O—B. When the same deflection occurs as a result of body motion, closure of the inertia valve limits compression to the small volume below the valve, the pressure rising along O—A.

If no bleed orifices are provided in the valve, the body would return from C to O with the pressure retracing its path along A—O with no energy dissipated, and hence no damping (except for friction, etc.). However, for the idealized condition, it may be assumed the body rests momentarily at C, while a bleed valve is opened, permitting free expansion until the pressures across the inertia valves are equalized. The pressure below the valve then reduces from A to B. The body then returns to its normal position with the pressure following along B—O.

The shaded area bounded by OABO then represents energy dissipated by the free expansion of the fluid, or represents the "thermodynamic damping" available for body motion.

The above illustration is an over-simplification. For the real case with fixed orifices, the area will be less, the corners at A and B will be rounded. Also, an infinite number of such diagrams may be drawn with the apex at O occurring anywhere, corresponding to the instantaneous spring length at which the inertia valve closes.

FIG. 16 is especially useful in illustrating and confirming results obtained by more laborious mathematical methods that "thermodynamic damping" is proportional to the amplitude of the displacement, rather than to velocity only, as with viscous damping. An approximate solution indicates that an equivalent viscous damping coefficient may be computed for compressible fluid damping, which, for a given cylinder, is proportional to the amplitude and molecular weight of the fluid, and inversely proportional to the absolute temperature and the square of the orifice area.

A similar cycle, OA'B'O may also be drawn for the body moving upwardly, or spring extension, as shown in FIG. 16. It has been found desirable to use a smaller orifice for the upper pilot mass than the lower pilot mass. This is because the rate of pressure change is less with spring extension; and also agrees with usual practice to provide larger damping for rebound than for jounce on conventional suspensions.

The mechanism further includes a ring-shaped rocker 76 pivoted on the upper side of the plate 48 at 78, and carries a valve 80 overlying the upper orifice 62. The center of gravity of the rocker lies above the pivot 78, and a light spring 82 normally holds the valve 80 away from the orifice 62. If the whole fluid spring assembly as shown is accelerated to the left the rocker tilts clockwise and closes the upper orifice 62. In similar fashion, a rocker 84 is pivoted on the under side of the plate 50 at 86 and carries a valve 88 underlying the lower orifice 62. The center of gravity of the rocker lies beneath the pivot 86, and a light spring 90 normally holds the valve 88 away from the orifice. If the whole fluid spring is accelerated rightwardly the rocker 84 tilts clockwise and closes the orifice 62. The plates 48 and 50 and other components shown are provided with gaskets 91 to seal orifices and to damp shock and clatter when the several members move relatively. Also, rockers 76 and 84 carry backstops 92 to establish their normal orifice-opening attitudes.

Viewing the fluid spring of FIG. 3 as a whole, let it be assumed that it connects the left rear wheel of a vehicle with the body. When the vehicle enters a right turn, the left side of the body moves down, due to the sway action of leftwardly acting centrifugal force. This causes the inertia assembly 48, 50, 52 to close ports 60. Additionally, valve 88 closes against plate 50, closing orifice 62, due to leftward-acting centrifugal force. Thus chamber 46 is isolated and its contained fluid acts as a high rate spring, resisting body descent and undue sway or tilt. As the turn is completed, centrifugal force abates, orifice 62 is opened, and the body restores to normal position with damping afforded by the orifice 62.

A fluid spring like that of FIG. 3 also connects the right side of the vehicle body with the right wheel. However, the spring is skewed 180° on its own axis, so the rocker 84 swings to close its orifice 62 in a counterclockwise direction or in response to the rightwardly acting centrifugal force resulting from a left turn.

The upper rocker 76 of the right hand fluid spring responds to leftwardly acting centrifugal force from a right turn, and the upper rocker 76 of the left hand fluid spring responds to rightwardly acting centrifugal force from a left turn.

Consider the fluid springs of FIG. 3 again, as located on the left side of the vehicle, and consider the vehicle in a left turn. The body sways to the right, and as there is left-side body rise, the piston 40 will rise against the plate 48 of the inertia assembly. Likewise, the upper rocker 76 will move clockwise due to centrifugal force, whereby the orifices 60 and upper orifice 62 will be closed. This isolates the fluid in the upper chamber 44, which acts as a high rate spring to strongly resist left-side body rise, while the fluid spring on the right side of the vehicle is resisting body dips urged by the left hand turn.

The fluid spring improvements described, then, provide two-way action to suppress body sway, when they are properly oriented on the two sides of the vehicle. The same fluid springs will also act to suppress body pitching during rapid acceleration and deceleration, if they are properly oriented to respond to forward and rearward acceleration as well as lateral acceleration. Such orientation consists simply in skewing the fluid springs on their own axes. For instance, let the arrows 94 in FIGS. 3–5 represent the horizontal direction of each fluid spring for orientation. This direction is one which, if an acceleration force is applied thereon, isolates the lower fluid spring chamber 46 to act as a high rate spring.

As implied before, the left hand fluid springs should have their datum arrows 94 directed leftwardly, and the right hand fluid springs should have their datum arrows 94 directed rightwardly. To stabilize against rearward pitch from accelerating the vehicle, the rearward fluid springs should have their datum arrows 94 directed rearwardly. Generally, then, the datum arrows face away from the center of the vehicle. To stabilize against forward pitch from vehicle deceleration, the forward fluid springs should have their datum arrows 94 directed forwardly. The diagram of FIG. 14 shows the orientation of fluid springs at the corners of the vehicle to provide pitch and roll stabilization. Each fluid spring is oriented according to the direction datum 94. The orientation angles may be adjusted to secure the best lateral and longitudinal responses from the fluid spring system, as the sensitivity for any one mode of action is reduced somewhat when the orientation direction is angled to the line of that mode of action.

FIGS. 7, 8, and 9 show an alternative construction for roll stabilizing valves in a fluid spring of the same general sort as shown in FIG. 3. Many of the fluid spring components are the same and bear the same reference characters. The upper plate 48' of the inertia assembly is in the form of a ring embracing the support tube 38 for the piston 40, and includes offset brackets 100 thereabove to which is pivoted a rocker 102, the latter having a toe 104 which comprises a valve operable to close the orifice 62' in the plate 48'. The rocker is offset from the fluid spring centerline, but has the same line of action in response to lateral accelerations as though it were centered. The orifices 62' in plate 48', and 60' in piston 40, are also offset to underlie the toe 104. The faces of plates 48' and 50' are provided with resilient gaskets 105 for sealing the orifices and for damping clatter of the inertia assembly during oscillation of the piston 40. The lower inertia plate 50' carries a pivot fitting 106 which supports an underlying rocker 108, the latter having a toe 110 comprising a valve operable to close the orifice 62' in the plate 50'. This rocker functions similarly to the rocker 84 in FIG. 3. Both rockers include backstops to limit their positions when the orifices 62, 62' are open. Conveniently, the pivot fitting 106 may extend through the plate 50' to provide an attachment point for the suspension spring by which the inertia assembly is supported.

Rockers 102 and 108 are preferably made from light metal or plastic, to which are secured weights 109 located in vertical alinement with the fluid spring axis, and spaced from the rocker pivots. Such construction minimizes rocker inertia to increase their speed of response to lateral acceleration.

FIGS. 10–12 show a modification of the invention applicable to bellows type fluid springs, which are known in the art. In FIGS. 10 and 11, main components of a single bellows suspension are shown, wherein 120 designates a wheel whose axle 122 is connected by any appropriate linkage 124 to a vehicle body and to the axle, an expandible bellows 126 is coupled which, when inflated, resiliently supports the body on the wheel. According to my invention, that elastic fluid which may be confined in a bellows provides a stiff single rate spring. The bellows may be coupled through conduits 128 and 130 through special valve 132 to a fluid reservoir 134. When valve 132 is open, the bellows 126 and reservoir 134 together comprise a large-volume compressed fluid quantity affording a low-rate fluid spring to provide superior vehicle riding quality.

In the present arrangement, the valve assembly 132 is secured to the body near its associated wheel and bellows, and comprises an upper housing 138 communicating with line 130, a lower housing 140 communicating with line 128 and a central partition 142 secured between the housings. This partition contains orifices 143 through which fluid may pass freely upon wheel movement and compression and expansion of bellows 126 resulting from wheel movement. An inertia assembly cooperates with the partition 140, and comprises upper and lower plates 144 and 146 joined by rods 148 passing through openings in the partitions. The inertia assembly is suspended by a low-rate spring 150, secured at its upper end within a tubular extension 152 of the housing 138.

The upper plate 144 carries a rocker 154 responsive to lateral acceleration forces, movable to cover a damping orifice 156 which in turn covers one of the orifices 143. Similarly, the lower plate 146 carries a rocker 158 responsive to opposite lateral acceleration forces, movable to cover a damping orifice 160 which in turn covers another of the orifices 143 in the partition 142.

The operation of the elements of the valve of FIG. 12 is the same as the operation of the corresponding elements in FIGS. 7–9. The partition 142 of FIG. 12 corresponds to the piston 40 of the other arrangements, these being movable with the vehicle body. The inertia assembly in all arrangements, and the associated rockers and orifices, have the same action, which has been described.

In FIG. 13, the valve arrangement at the lower part is like that shown in FIG. 12, but is attached directly to the reservoir 134', instead of being separate therefrom. The FIG. 13 arrangement implies that there be a reservoir 134' disposed near each wheel, which may be under some design requirements preferable to placing reservoirs remotely from the wheels as can be done with the FIGS. 10–12 arrangements.

FIG. 15 shows curves of vertical body oscillation against time resulting from an initial displacement of the body of a vehicle. The dotted line is the result produced by the conventional relatively low-rate spring and underdampened shock absorber combination. This allows several oscillations of the body before it stabilizes, as shown by the repetitive undulations of the curve. The solid line is the result produced in a similar vehicle equipped with the discriminating critically damped fluid spring of the invention. Clearly, the latter has less rebound and the oscillations damp out promptly.

The invention provides a suspension system which uses the advantages of stiff springing for turn stability and maneuvering, the advantages of soft springing for easy riding quality and free wheel motion, and the advantages of selective large damping for suppressing body motion.

The several arrangements of the invention shown are merely exemplary, and are susceptible to various changes and modifications. I aim in the annexed claims to embrace all such changes and modifications.

I claim:

1. A vehicular fluid spring comprising two chambers containing compressible fluid and having parts respectively secured to the vehicle frame and to the unsprung portion of the vehicle assembly, said parts being relatively movable upon relative movement of said frame and assembly, means between said chambers having an opening normally placing said chambers in free communication, inertia means resiliently supported on the part secured to said frame operable in response to frame movement to close said opening, said inertia means having a bleed opening therein allowing restricted fluid flow therethrough when said inertia means closes said opening, a rocker articulated to said inertia means swingable laterally relative thereto in response to lateral acceleration of said vehicle, and means carried by said rocker operable upon rocker swinging to close said bleed opening.

2. A vehicular fluid spring comprising an expandible and contractable bellows containing compressible fluid secured between the sprung vehicle structure and the unsprung vehicle road engaging assembly, a substantially fixed volume chamber on the vehicle, a valve between said bellows and chamber having conduits connected with each, said valve having a normally open aperture therein opening said bellows and chamber for free communication with one another, a first inertia member in said valve responsive to vertical acceleration of said vehicle structure to partly close said valve opening, and a second inertia member movably mounted on the first inertia member responsive to horizontal acceleration of the vehicle structure to close said valve opening.

3. A vehicular fluid spring comprising an expandible and contractable bellows containing compressible fluid secured between the sprung vehicle structure and the unsprung vehicle road engaging assembly, a substantially fixed volume chamber on the vehicle, a valve between said bellows and chamber mounted on said sprung structure having conduits connected with each, said valve having a normally open aperture therein opening said bellows and chamber for free communication within one another, a first inertia member in said valve supported by said sprung structure responsive to vertical acceleration of said vehicle structure to close said valve opening, said member having a bleed orifice therein to pass restricted amounts of fluid when said valve opening is closed, and a second inertia member movably mounted on said first member, movable in response to horizontal vehicle acceleration to close said bleed orifice.

4. A vehicular fluid spring comprising an expandible and contractable bellows containing compressible fluid secured between the sprung vehicle structure and the unsprung vehicle road engaging assembly, a substantially fixed volume chamber on the vehicle, a valve between said bellows and chamber mounted on said sprung structure having conduits connected with each, said valve having a normally open aperture therein opening said bellows and chamber for free communication with one another, a first inertia member in said valve supported by said sprung structure responsive to vertical acceleration of said vehicle structure to close said valve opening, said member having a small bleed orifice therein and another valve associated therewith to pass restricted amounts of fluid in one direction when said valve opening is closed, said valve having a still smaller bleed orifice to pass a lesser amount of fluid in the other direction, and a second inertia member movably mounted on the first inertia member responsive to horizontal acceleration of the vehicle to close said bleed orifices.

5. A vehicular fluid spring comprising an upper chambered cylinder secured to the sprung vehicle structure and a lower chambered cylinder sleeved with the first and secured to move with the unsprung road engaging assembly of the vehicle, an apertured partition separating said cylinder chambers from one another and carried by said upper cylinder, inertia means resiliently supported by the upper cylinder engageable with said partition to partly close said aperture upon vertical acceleration of said sprung structure, said inertia means having bleed orifices of different size therein to allow limited fluid flow therethrough when said aperture is partly closed, valve means on said inertia means operable to close certain of said orifices accordingly as partition acceleration is fast or slow, and an inertia mass movably mounted on said inertia means movable relative thereto in response to horizontal vehicle acceleration, said inertia mass upon movement thereof due to horizontal acceleration moving to close certain of said orifices.

6. A vehicular spring comprising a chamber secured to the sprung vehicle structure and a chamber secured to the unsprung road engaging assembly, said chambers containing compressible fluid and having communication means connecting them, said means including an opening for passage of fluid, first inertia means supported by the sprung structure operable to partly close said opening in response to sprung structure vertical acceleration, and second inertia means movably mounted on said first inertia means operable to wholly close said opening only when it has been partly closed from vertical acceleration, upon horizontal acceleration of said vehicle structure.

7. A vehicular fluid spring comprising two chambers, one of variable volume, containing compressible fluid and said spring having parts secured to the vehicle frame and to the unsprung portion of the vehicle assembly, said parts being relatively movable upon movement of said frame relative to said assembly, a partition between said chambers secured for movement with said frame and having openings therein to allow free passage of fluid between said chambers, inertia means relative to which said partition is movable to close said openings, said inertia means having a small bleed opening therein for enabling relatively slow flow of fluid therethrough to damp relative movement thereof, said inertia means having a second bleed opening therein larger than the first, and a valve on said inertia means movable at times to open and close said second bleed opening.

8. A vehicular fluid spring comprising an upper chambered cylinder secured to the vehicle frame and a lower chambered cylinder secured to the unsprung portion of the vehicle assembly, an apertured partition separating said cylinder chambers from one another, inertia means resiliently supported by said upper cylinder engageable with said partition to substantially close said aperture upon vertical acceleration of said frame, said inertia means having a plurality of bleed orifices of different size therein to allow limited fluid flow therethrough when said aperture is substantially closed, and valve means on said inertia means operable to open and close certain of said bleed orifices accordingly as said partition acceleration is fast or slow.

References Cited in the file of this patent

UNITED STATES PATENTS

| | | |
|---|---|---|
| 2,115,072 | Hunt et al. | Apr. 26, 1938 |
| 2,144,583 | Focht | Jan. 17, 1939 |
| 2,275,462 | Parilla | Mar. 10, 1942 |
| 2,802,675 | Ross | Aug. 13, 1957 |
| 2,827,283 | Browne et al. | Mar. 18, 1958 |
| 2,874,647 | Candlin | Feb. 24, 1959 |

FOREIGN PATENTS

| | | |
|---|---|---|
| 469,473 | Great Britain | July 23, 1937 |
| 699,231 | Germany | Nov. 25, 1940 |